US00RE38182E

(19) United States
(12) Reissued Patent
Nylen et al.

(10) Patent Number: US RE38,182 E
(45) Date of Reissued Patent: Jul. 15, 2003

(54) SQUIRREL BAFFLER

(76) Inventors: Link Nylen, 617 N. 10th, Winterset, IA (US) 50273; Ron Rainey, Lot 209, Sun Valley Lake, Ellston, IA (US) 50074

(21) Appl. No.: 09/022,218

(22) Filed: Feb. 11, 1998

Related U.S. Patent Documents

Reissue of:
(64) Patent No.: 5,642,687
Issued: Jul. 1, 1997
Appl. No.: 08/652,133
Filed: May 23, 1996

(51) Int. Cl.[7] ..... A01K 39/00
(52) U.S. Cl. ..... 119/52.3; 119/57.9; 119/469
(58) Field of Search ..... 119/52.3, 57.9, 119/815, 469; 248/200.1, 201, 205.1, 207, 218.4, 219.3, 219.1, 219.4, 316.6, 222.31

(56) References Cited

U.S. PATENT DOCUMENTS 2,493,107 A * 1/1950 Bush ..... 114/221
D174,139 S * 3/1955 Sadler ..... D31/2
2,931,336 A * 4/1960 Cather ..... 119/52
3,036,554 A * 5/1962 Johnson
3,051,126 A * 8/1962 Merritt et al. ..... 119/52
3,090,354 A * 5/1963 Merritt et al. ..... 119/52
3,768,441 A * 10/1973 Laham
4,144,842 A * 3/1979 Schlising ..... 119/52
4,523,546 A * 6/1985 Latham ..... 119/51
4,767,088 A * 8/1988 Fielder et al. ..... 248/121
5,088,672 A * 2/1992 Neuendorf et al. ..... 249/218
5,347,769 A * 9/1994 Dinsmore ..... 52/101
5,349,927 A * 9/1994 Campbell ..... 119/815
5,826,542 A * 10/1998 Allen et al. ..... 119/57.9

* cited by examiner

*Primary Examiner*—Peter M. Poon
*Assistant Examiner*—Yvonne R. Abbott
(74) *Attorney, Agent, or Firm*—McKee, Voorhees & Sease, P.L.C.

(57) ABSTRACT

A squirrel baffler wherein the baffler consists of a conical shaped sheet member supported by a bracket assembly which prevents a squirrel or other unwanted animal from climbing a pole or post supporting a bird house or feeder. The conical shaped sheet member may be disassembled and assembled around the pole by use of interlocking members running the length of the sheet member such that the user does not have to remove the bird feeder from the pole or remove the pole from the ground first.

13 Claims, 2 Drawing Sheets

SQUIRREL BAFFLER

Matter enclosed in heavy brackets [ ] appears in the original patent but forms no part of this reissue specification; matter printed in italics indicates the additions made by reissue.

BACKGROUND OF THE INVENTION

Thousands of people have some type of bird house or bird feeder in their yards. Bird feeders not only provide birds with a readily available food source during the colder months, but also provide an enjoyable pastime for bird watchers. What is often a relaxing and enjoyable pastime, however, can often become frustrating when a squirrel eats the food from the bird feeder. First, squirrels can eat many times more food than birds. The result is that the owner of the bird feeder must more frequently refill the bird food in order to attract birds and ensure that the birds have a sufficient amount of food. Second, this frequent replacement of bird food can become costly and inconvenient for the owner of the bird feeder. Third, a squirrel eating from a bird feeder will usually scare off the birds, thus defeating the purpose of having the feeder in the lust place. Finally, a bind feeder is not normally meant to withstand the extra weight of a squirrel and may therefore become damaged or broken.

Attempts at keeping squirrels off of bird feeders have been deficient since squirrels are by nature extremely agile and cunning animals. Strategies have included altering the pole the bird feeder sits on so that it is slippery and thereby more difficult for squirrels to climb. Squirrels often are still able to overcome this obstacle, however, and reach the bird feeder.

Another strategy consists of altering the bird feeder itself. An example is a bird feeder which tilts if too much weight is placed on one side, thus causing the squirrel or other predator to fall off. While this type of feeder is sometimes successful in keeping squirrels off, it also prevents larger birds from feeding on it as well.

Some owners of bird feeders even resort to placing an additional feeder in their yards, hoping that the squirrels will eat from this feeder and leave the food in the bird feeder alone. Instead, the result is usually that the squirrel ends up getting an additional source of food.

Finally, by the time the owner of a new bird feeder realizes that a problem exists, it becomes costly and inconvenient to change the structure of the feeder in an attempt to solve the problem.

There is therefore a need in the art for an effective means of preventing squirrels and other predatory animals from eating the food from bird feeders which can be added to a new or existing feeding system.

Therefore, a primary objective of the present invention is a provision of an improved squirrel baffler.

Another objective of the present invention is the provision of an improved squirrel baffler which is easy to install and convenient to use, even on existing structures.

A further objective of the present invention is the provision of an improved squirrel baffler which does not prevent birds from eating from the bird feeder.

A further objective of the present invention is the provision of an improved squirrel baffler which is economical to manufacture and durable.

These and other objectives will be apparent from the following description of the invention.

SUMMARY OF THE INVENTION

The squirrel baffler of the present invention is intended to be used in conjunction with traditional bird houses and feeders which are mounted on a pole or post. The squirrel baffler is generally conical in shape with a single seam extending longitudinally along its outer surface when assembled. The longitudinal seam is formed by two interlocking members substantially running the length of the baffler which are used to engage and disengage the baffler around a pole. The interlocking members provide a means for attaching and removing the baffler from the pole with ease. The baffler is constructed from a material having some elasticity so that the user can operatively seal or unseal the baffler by interlocking or uninterlocking the two opposing ends of the longitudinal seam. The baffler tests upon a bracket assembly upon which is placed on the pole prior to the installation of the baffler. The bracket assembly serves to maintain the height of the baffler on the pole.

In practice, the bracket is first positioned on the bird feeder pole and is held in place on the pole by friction, the force provided by bolts or other equivalent means. The bracket is next placed on the pole above the bracket so as to slide down the pole until it engages the bracket which prevents further downward movement. The bracket and thus the baffler is adjustable to any height on the pole by disengaging the friction producing bolts or other means on the bracket. The above installment procedure can be accomplished without removing the bird feeder from the pole or removing the pole from the ground first. Once installed, a squirrel who would normally climb the pole in order to reach the bird food in the feeder is prevented from reaching the feeder due to the presence of the baffler blocking its path along the pole.

BRIEF DESCRIPTION OF THE DRAWINGS

[FIG. 8 is an elevational view of the squirrel baffler showing the optional hanging assembly.

Figure is a perspective view of the squirrel baffler with an optional hanging assembly as seen in a store display.]

DETAILED DESCRIPTION OF THE PREFERRED EMBODIMENT

Figure 1:
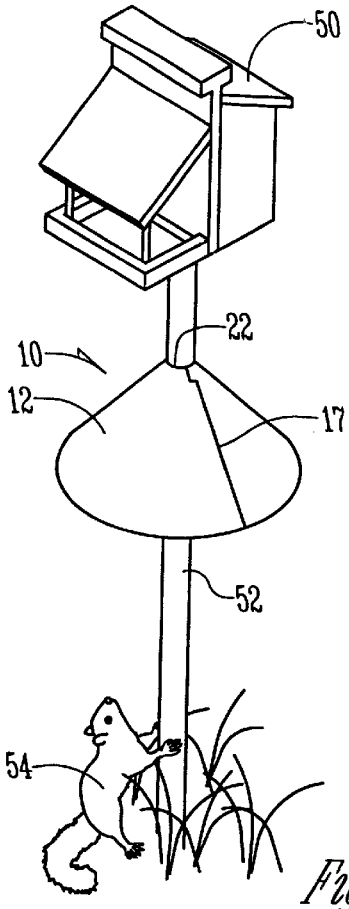
FIG. 1 is an elevational view of an improved squirrel baffler in accordance with the present invention as it is attached to a pole or post beneath a bird feeder.
Figure 2:
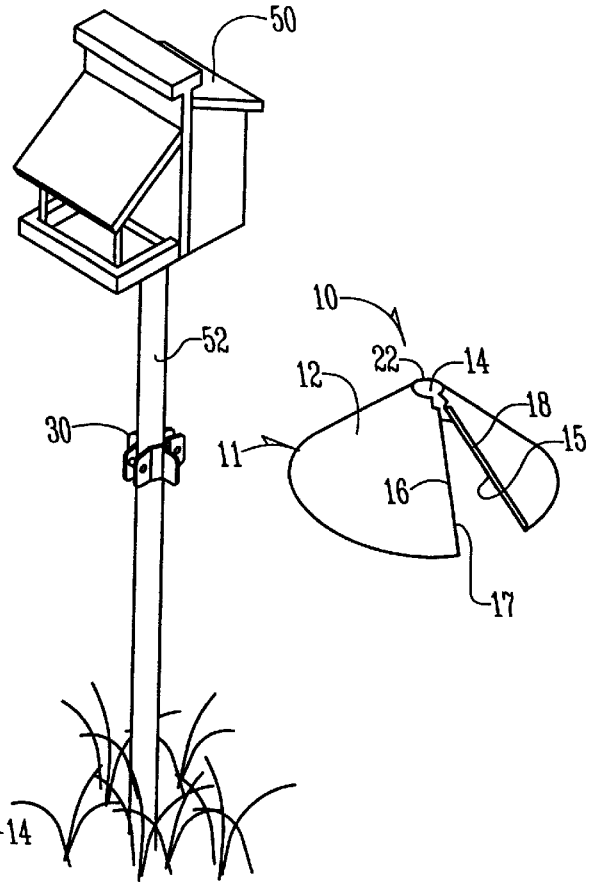
FIG. 2 is an elevational view of the improved squirrel baffler removed from the pole.
Figure 3:
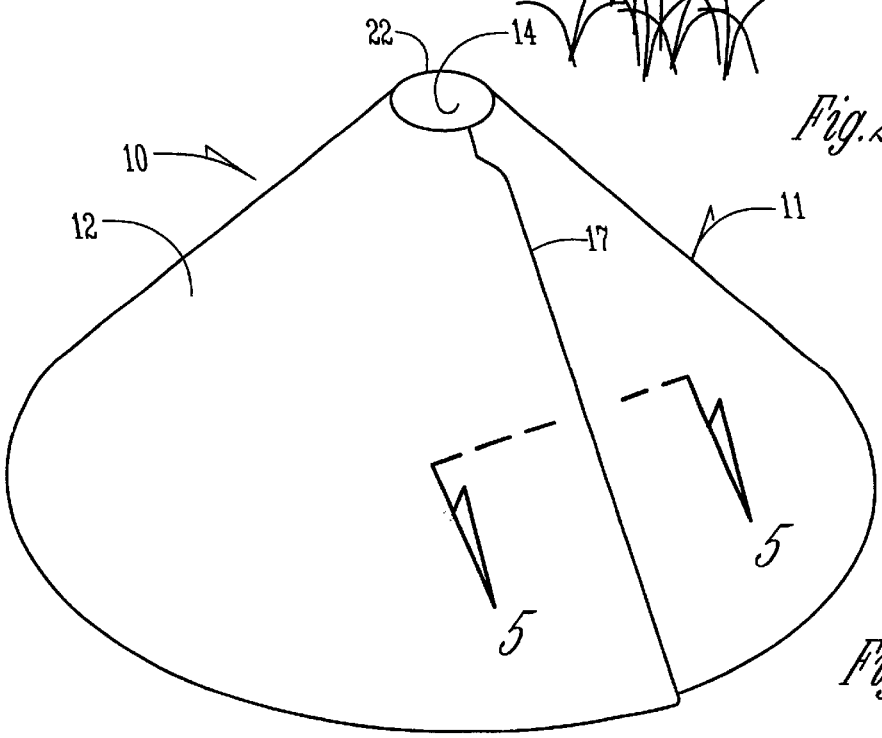
FIG. 3 is a perspective view of the squirrel baffler in its closed position.
Figure 4:
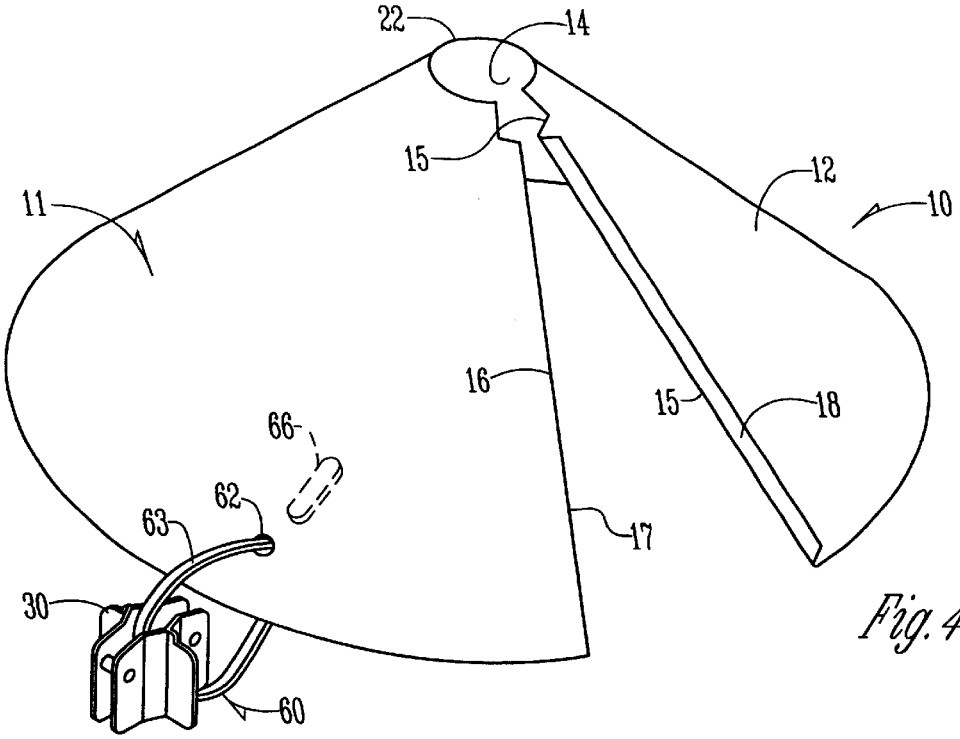
FIG. 4 is a perspective view of the squirrel baffler with longitudinal seam disengaged.
Figure 5:
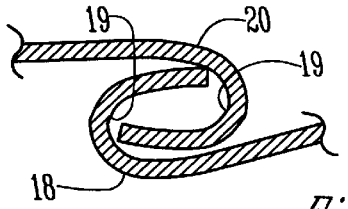
FIG. 5 is a cross sectional view of the interlocking members of the longitudinal seam taken along lines 5—5 of FIG. 3.

The squirrel baffler of the present invention is generally designated in the drawings by the reference numeral 10 as shown in FIGS. 1–4. The squirrel baffler 10 is generally conical in shape when assembled as in FIGS. 1 and 3 with the body 11 comprising a single piece and including an outer surface 12 and a inner surface 14. When the squirrel baffler 10 is disassembled as shown in FIGS. 2 and 4, the body 11 forms edges 15 and 16 vertically running the length of body 11. Edges 15 and 16 terminate into interlocking members 18 and 20 respectively. Each interlocking member 18 and 20 runs the length of or substantially the length of edges 15 and 16 respectively. Each interlocking member 18 and 20 curves inwardly to form an open-ended channel 19 which provides the means for securably connecting the interlocking members 18 and 20 when the squirrel baffler 10 is assembled as shown in FIG. 5. When connected, the open-ended channels 19 are biased, thus creating a force which provides a secure connection. When assembled, the interlocking members 18 and 20 join to form a longitudinal seam 17.

The squirrel baffler 10 further includes a perimeter edge 22 which surrounds a pole or post 52 used to support a bird house or bird feeder 50 when the squirrel baffler 10 is installed, as best shown in FIG. 1. The squirrel baffler 10 is held securely in place on pole 52 by bracket assembly 30.

Figure 6:
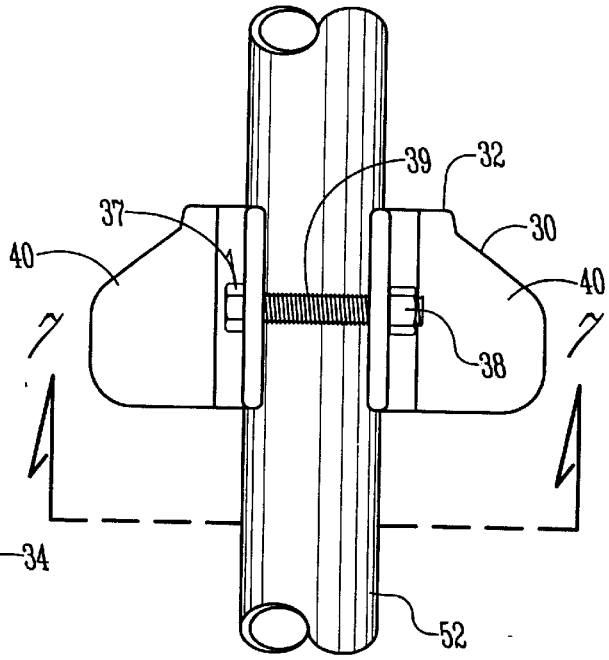
FIG. 6 is a perspective view of the bracket assembly as positioned on the pole.
Figure 7:
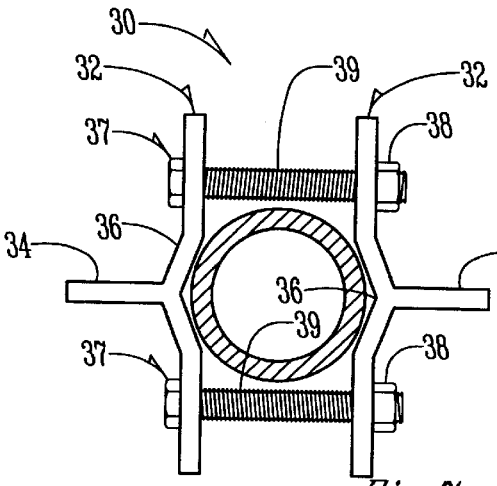
FIG. 7 is a cross sectional view of the pole and the surrounding bracket assembly taken along lines 7—7 of FIG. 6.

The bracket assembly 30 comprises a pair of substantially T-shaped cross bars 32 having center section 36 with legs 34 extending outwardly from center section 36 as shown in FIG. 7. In a preferred embodiment, center section 36 is recessed to matingly engage pole 52. Cross bars 32 are designed to receive a pair of nut and bolt assemblies each generally designated as 37 and each including a nut 38 and a bolt 39 or other connecting means to link T-shaped cross bars 32 so as to form a continuous means of support encircling pole 52 for squirrel baffler 10. The present invention contemplates that other connecting means may be used to link T-shaped cross bars, such as rivets, nails, screws, etc. which may be readily ascertained by those of ordinary skill in the art. The legs 34 extend outwardly to form flaps 40 which further prevent squirrel baker 10 from sliding down pole 32. In a preferred embodiment, flaps 40 gradually become wider to further extend outwardly from pole 52 so that they are generally rudder-shaped as best illustrated by FIG. 6.

The squirrel baffler 10 may be constructed from a variety of materials, the only requirement being that the material be sturdy but flexible so that the user is able to bend the body 11 inwardly to connect interlocking members 18 and 20. Such materials include plastic and metals having the required elasticity with the preferred material being metal.

The squirrel baffler 10 may optionally include a hanging assembly 60 useful for displaying squirrel baker 10, such as on a rack (not shown). A hole 62 is placed in body 11 through the inner surface 14 and outer surface 12 of squirrel baffler 10. A piece of leather, plastic, or other threadable material 63 is then threaded through hole 62 [to form a continuous loop 64], thus providing a means for hanging squirrel baffler 10 from a rack or other displaying means. [The loop 64 may also be used to secure bracket assembly 30 to squirrel baffler 10 by threading material 63 through a portion of bracket assembly 30 to form a continuous loop 64. In this manner, squirrel baffler 10 may then be displayed and sold in one interconnected piece. The user simply cuts loop 64 to free bracket assembly 30 prior to installing squirrel baffler 10.] If hanging assembly 60 is placed on squirrel baffler 10, the squirrel baffler 10 may also require a balancing piece 66 placed on the same side of body 11 as hole 62 to offset the material displaced by hole 62. The only requirements of balancing piece 66 are that it be of a size sufficient and placed in such a manner such that squirrel baffler 10 is evenly balanced when placed on bracket assembly 30. In a preferred embodiment, balancing piece 66 is oblong-shaped and is placed proximate to hole 62.

Furthermore, the bracket assembly 30 may also be constructed of various materials, the only requirement being that the materials are sturdy enough to support the squirrel baffler 10 when placed on top of bracket assembly 30.

Furthermore, other fastening devices besides a nut and bolt assembly 37 may be utilized in order to serve the purpose of connecting the T-shaped cross bars 32. Such acceptable fastening devices are well known and readily ascertained by those of ordinary skill in the art.

During the installation process, the user first connects the bracket assembly 30 to pole or post 52. This is accomplished by placing each T-shaped cross bar 32 on either side of pole 52. The nut and bolt assembly 37 or other fastening means is then connected to T-shaped cross bars 32 so that the bracket assembly 30 is frictionally attached to pole 52.

Next, the user disassembles squirrel baffler 10 by squeezing interlocking means 18 and 20 inwardly so as to disengage open-ended channels 19. The squirrel baffler 10 is then ready to be placed around pole 52 above bracket assembly 30. The squirrel baffler 10 is reconnected by pushing edges 15 and 16 inwardly and sliding interlocking means 18 and 20 together so as to engage open-ended channels 19. The squirrel baffler 10 is then slid into place downwardly on pole 52 so that it rests securely on top of bracket assembly 30.

In practice, a squirrel 54 or other animal trying to reach the food in the bird house or bird feeder 50 will attempt to do so by climbing pole a post 52. Squirrel baffler 10, however, presents an obstruction in the path of the squirrel 54 on pole 52 so that it will be unable to climb the pole 52, thus making it impossible for the squirrel 54 to reach the food in bird feeder or bird house 50.

As previously mentioned, the squirrel baffler 10 is extremely convenient for the bird feeder owner to use since it may be installed without removing the bird feeder 50 from the pole 52 and without removing pole 52 from the ground first. Since the squirrel baffler 10 consists of very few pieces and may be made of relatively inexpensive materials, it is also easy and economical to manufacture.

The invention has been shown and described above in connection with the preferred embodiment, and it is understood that many modifications, substitutions, and additions may be made which are within the intended broad scope of the invention. From the foregoing, it can be seen that the present invention accomplishes at least all the stated objectives.

What is claimed is:

1. A squirrel baffler for preventing squirrels and other predators from reaching a bird feeder which is supported by a pole comprising:

a pair of [T-shaped] brackets wherein each [generally T-shaped] bracket [has two flanges and a center section between the flanges with an arm extending substantially perpendicular from each center section, wherein each of the flanges connectively] receives a fastening means;

fastening means for connecting [the flanges of] each [T-shaped] bracket such that the [T-shaped brackets] *brackets* can form a continuous structure around a pole supporting a bird feeder;

a generally conical shaped flexible sheet member above and supported by said [T-shaped] brackets wherein said sheet member terminates at two ends forming two interlocking members running substantially the vertical length of the sheet member [and further providing that the interlocking members are biased].

2. A squirrel baffler according to claim 1 wherein the fastening means comprises a [nut and] bolt assembly.

3. A squirrel baffler according to claim 1 wherein the flexible sheet member is made of a material selected from the group consisting of metal and plastic.

4. A squirrel baffler according to claim 1 wherein the interlocking members fold over to form open-ended channels.

5. A squirrel baffler according to claim 1 wherein each [T-shaped] bracket has a center section wherein each center section is recessed to matingly receive the pole.

6. A squirrel baffler according to claim 1 wherein the squirrel baffler further includes a hanging assembly comprising:

a piece of material threaded through a hole in the sheet member to form a loop;

a balancing member proximate to the hole in the sheet member of a size sufficient to balance the conical shaped device on the bracket assembly.

7. A squirrel baffler according to claim 1 wherein [the] arms extend downwardly and progressively widen to form flaps extending perpendicularly from each center section.

8. A method of preventing squirrels and other predators from reaching a bird feeder which is supported by a pole comprising:

assembling two [generally T-shaped] brackets, each bracket having opposite ends, on a pole so that the brackets surround the pole;

connecting the brackets with a fastening means such that the brackets form a continuous bracket assembly;

placing a conical shaped flexible sheet member on top of the bracket assembly so that the sheet member surrounds the pole, wherein the sheet member terminates into two edges forming two biased interlocking members running substantially the vertical length of the sheet member which connectively secure the sheet member to the pole.

9. A method according to claim 8 wherein the fastening means is a nut and bolt assembly connecting each opposite end of the first bracket to one opposing end of the second bracket.

10. A method according to claim 8 wherein the flexible sheet member is made of a material selected from the group consisting of metal and plastic.

11. A method according to claim 8 wherein the interlocking members have ends which are folded over to form open-ended channels.

12. A method according to claim 8 wherein each [T-shaped] bracket has a center section wherein each center section is recessed to matingly receive the pole.

13. A method according to claim 8 wherein the sheet member is balanced on top of said bracket assembly on the pole.

* * * * *